US007963041B1

(12) United States Patent
Smith

(10) Patent No.: US 7,963,041 B1
(45) Date of Patent: Jun. 21, 2011

(54) GUARD FOR FILAMENT-TYPE TRIMMER FOR PROTECTION WHILE TRIMMING VEGETATION

(76) Inventor: Craig A. Smith, Camas, WA (US)

( * ) Notice: Subject to any disclaimer, the term of this patent is extended or adjusted under 35 U.S.C. 154(b) by 667 days.

(21) Appl. No.: 11/824,660

(22) Filed: Jul. 2, 2007

Related U.S. Application Data

(60) Provisional application No. 60/820,291, filed on Jul. 25, 2006.

(51) Int. Cl.
*B26B 29/00* (2006.01)

(52) U.S. Cl. .......................................... 30/286; 30/347

(58) Field of Classification Search .................. 30/286, 30/276, DIG. 5, 347; D8/8; 56/12.7; 172/13, 172/15, 17
See application file for complete search history.

(56) References Cited

U.S. PATENT DOCUMENTS

| | | | |
|---|---|---|---|
| 2,263,431 A | 11/1941 | White | |
| 2,707,859 A | 5/1955 | Walker | |
| 2,708,335 A | 5/1955 | Newton | |
| 3,006,421 A | 10/1961 | Feilbach | |
| 3,831,278 A | 8/1974 | Voglesonger | |
| 3,928,911 A | 12/1975 | Pittinger et al. | |
| 4,007,525 A | 2/1977 | Utter | |
| 4,047,299 A | 9/1977 | Bair | |
| 4,052,789 A | 10/1977 | Ballas | |
| 4,068,376 A | 1/1978 | Briar | |
| 4,107,841 A | 8/1978 | Rebhun | |
| 4,118,865 A | 10/1978 | Jacyno et al. | |
| 4,134,204 A | 1/1979 | Perdue | |
| 4,152,832 A | 5/1979 | Akaike et al. | |
| 4,161,820 A | 7/1979 | Moore | |
| 4,172,322 A | 10/1979 | Ballas | |
| 4,183,138 A | 1/1980 | Mitchell et al. | |
| 4,189,901 A | 2/1980 | Poettgen | |
| 4,200,978 A | 5/1980 | Irelan et al. | |
| 4,205,510 A | 6/1980 | Raniero | |
| 4,209,902 A | 7/1980 | Moore et al. | |
| 4,236,309 A | 12/1980 | Cayou | |
| 4,237,610 A | 12/1980 | Bradus et al. | |
| 4,268,964 A | 5/1981 | Moore | |
| 4,287,670 A | 9/1981 | Baker | |
| 4,316,325 A | 2/1982 | Brucker | |
| 4,335,510 A * | 6/1982 | Close et al. ..................... 30/276 |
| 4,338,719 A | 7/1982 | Burkholder | |
| 4,426,780 A | 1/1984 | Foster | |
| 4,475,287 A * | 10/1984 | Beihoffer ........................ 30/276 |
| 4,501,332 A | 2/1985 | Straayer | |
| 4,550,499 A | 11/1985 | Ruzicka | |
| 4,571,831 A | 2/1986 | White | |
| 4,641,431 A | 2/1987 | Leming et al. | |
| 4,679,385 A | 7/1987 | Carmine | |
| 4,702,005 A | 10/1987 | Pittinger et al. | |

(Continued)

*Primary Examiner* — Sean Michalski
(74) *Attorney, Agent, or Firm* — Law Office of Karen Dana Oster, LLC

(57) ABSTRACT

A guard including three sub-systems: a main guard body, a solid shield, and an attachment mechanism. The main guard body includes a base, a peripheral exterior ring, and a plurality of supports for holding the peripheral exterior ring in spaced relationship with the base. Together, the base, the peripheral exterior ring, and the plurality of supports define at least one aperture. The solid shield is attachable to the main guard body. The attachment mechanism is used to attach the main guard body to an extension member of a filament-type trimmer. When positioned, a rotatable non-rigid filament of the filament-type trimmer is peripherally surrounded by the main guard body when the rotatable non-rigid filament is rotating.

20 Claims, 7 Drawing Sheets

U.S. PATENT DOCUMENTS

| | | |
|---|---|---|
| 4,756,084 A | 7/1988 | Morita |
| 4,756,148 A | 7/1988 | Gander et al. |
| 4,803,831 A | 2/1989 | Carmine |
| 4,864,728 A * | 9/1989 | Kloft et al. ............... 30/276 |
| 4,890,389 A * | 1/1990 | Whitkop ............... 30/276 |
| 5,009,369 A | 4/1991 | Iwaszkowiec |
| 5,010,720 A * | 4/1991 | Corsi ............... 56/320.1 |
| 5,023,998 A | 6/1991 | Masciarella et al. |
| 5,029,435 A | 7/1991 | Buchanan |
| 5,048,187 A * | 9/1991 | Ryan ............... 30/276 |
| 5,048,278 A | 9/1991 | Jones et al. |
| 5,060,383 A | 10/1991 | Ratkiewich |
| 5,077,898 A | 1/1992 | Hartwig |
| 5,115,870 A | 5/1992 | Byrne |
| 5,351,403 A | 10/1994 | Becker et al. |
| RE34,815 E | 1/1995 | Byrne |
| 5,402,627 A | 4/1995 | Trompler et al. |
| 5,414,934 A | 5/1995 | Schlessmann |
| 5,477,665 A | 12/1995 | Stout |
| 5,493,784 A * | 2/1996 | Aiyama ............... 30/276 |
| 5,524,349 A * | 6/1996 | Dolin ............... 30/276 |
| D373,712 S | 9/1996 | Bridgers |
| 5,584,348 A * | 12/1996 | Butler ............... 172/13 |
| 5,615,970 A | 4/1997 | Reekie et al. |
| 5,644,844 A | 7/1997 | Pink |
| D382,779 S | 8/1997 | Meisner |
| D382,780 S | 8/1997 | Meisner |
| 5,657,542 A | 8/1997 | White et al. |
| 5,924,205 A | 7/1999 | Sugihara et al. |
| 5,950,317 A * | 9/1999 | Yates et al. ............... 30/276 |
| 5,996,234 A * | 12/1999 | Fowler et al. ............... 30/276 |
| 6,052,976 A | 4/2000 | Cellini et al. |
| 6,324,765 B1 * | 12/2001 | Watkins, Sr. ............... 30/276 |
| 6,327,782 B1 * | 12/2001 | Blevins ............... 30/276 |
| 6,665,942 B2 * | 12/2003 | Richardson et al. ............... 30/276 |
| 6,842,985 B2 * | 1/2005 | Richardson et al. ............... 30/276 |
| D625,972 S * | 10/2010 | Sweeney ............... D8/8 |
| 2009/0271992 A1* | 11/2009 | Holter ............... 30/276 |

* cited by examiner

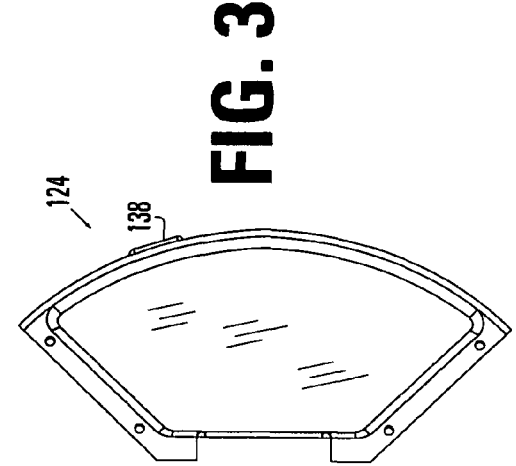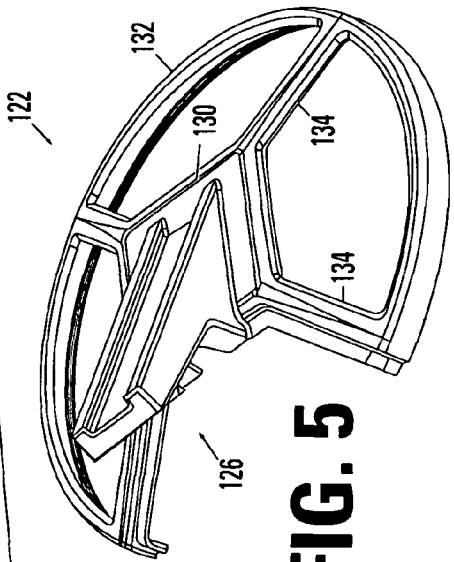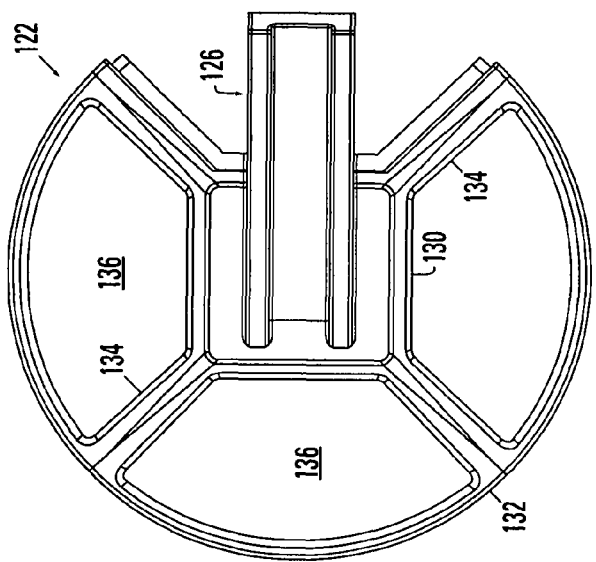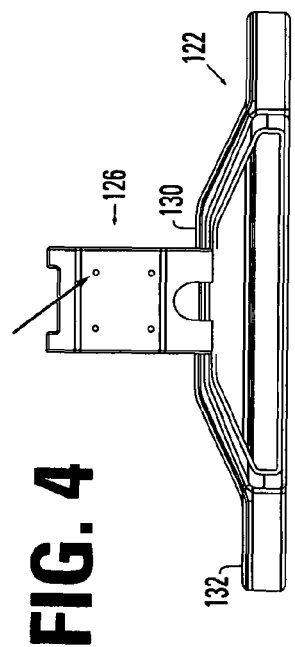

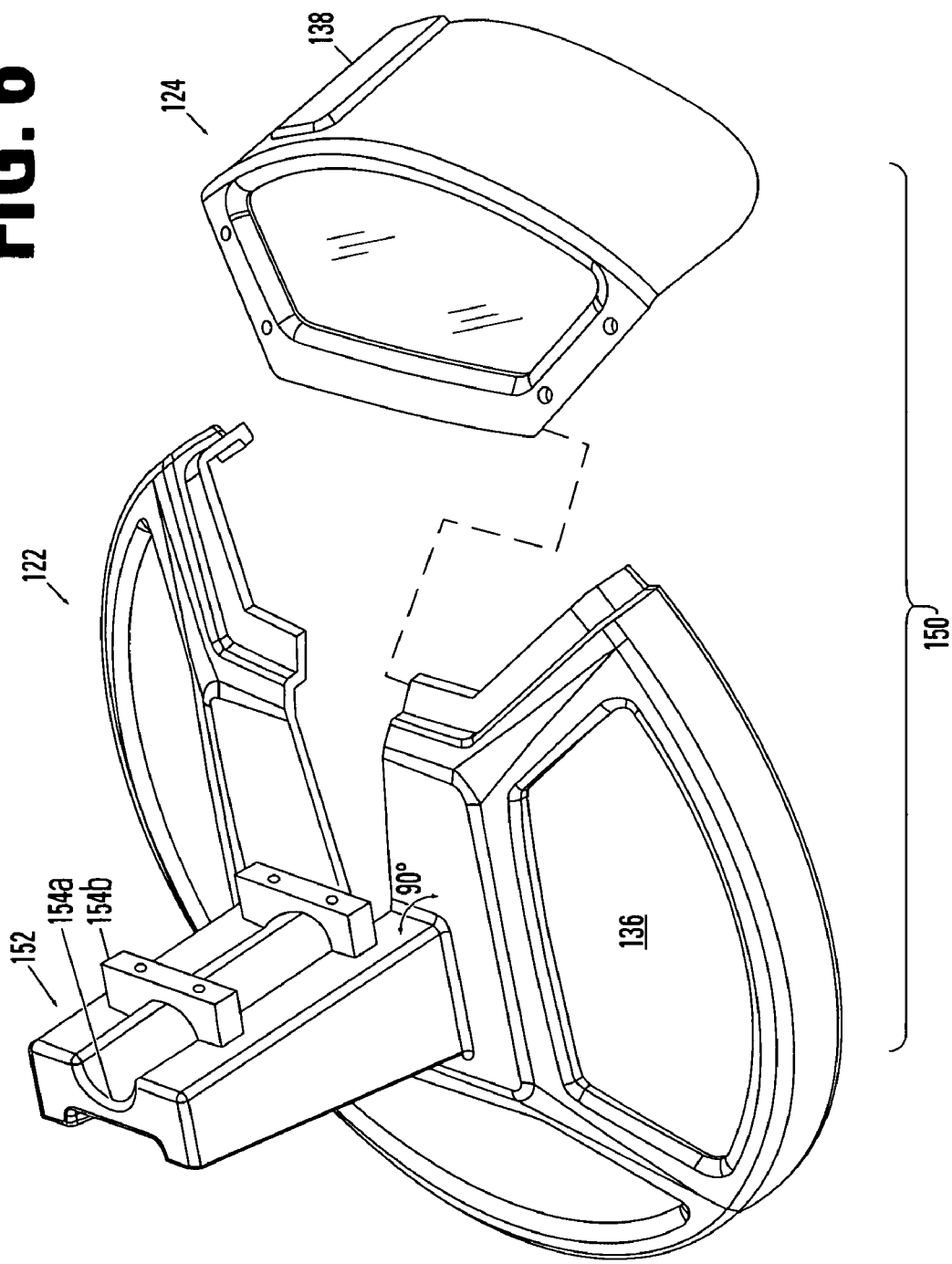

GUARD FOR FILAMENT-TYPE TRIMMER FOR PROTECTION WHILE TRIMMING VEGETATION

The present application is an application claiming the benefit under 35 USC Section 119(e) of U.S. Provisional Patent Application Ser. No. 60/820,291, filed Jul. 25, 2006. The present application is based on and claims priority from this application, the disclosure of which is hereby expressly incorporated herein by reference in its entirety.

BACKGROUND OF INVENTION

The present invention relates to a guard for a filament-type trimmer and, more particularly, to a guard for a filament-type trimmer for protecting saplings and other structures not to be trimmed while simultaneously trimming grass, weeds, and other vegetation that is to be at least partially trimmed.

Various types of devices have been proposed for many years to facilitate the removal of vegetation by mowing, trimming, edging and like operations. In general, these devices have employed a metal blade to effect vegetation removal.

There are various forms of "filament-type trimmers" used for the purpose of trimming "vegetation." The term "filament-type trimmers" will be used herein to describe products including, but not limited to, flail-type cutters, flail trimmers, string trimmers, cord-type cutting device, and other means for trimming as well as products known as Weed-Whackers™, Weed-Wackers™, Weed Eaters™, Weed Whips™, Weed Crashers™, and Weed Wonders™. The term "trimming" will be used herein to describe processes such as cutting, edging, cultivation, and other trimming processes. The term "vegetation" will be used herein to describe grass, weeds, ground covering, blackberries, and other types of vegetation.

Filament-type trimmers generally include a head assembly substantially at a first end of an extension member and a handle assembly (for one or two handed operation) substantially at a second end of the extension member. An activator (e.g. a switch) for selectively applying power to the filament-type trimmer may be positioned, for example, on the handle assembly or the extension member. The head assembly includes a rotatable head with at least one non-rigid filament (e.g. a flexible cutting line, radial strands, string) that extends generally radially outwardly. The filament-type trimmers trim by means of the filament that extends generally radially outwardly from the rotatable head when the rotatable head rotates at high speeds. Filament-type trimmers work because the filaments rotate at high speed under which they assume a tensioned condition due to centrifugal force. It has been found that these filaments can be used to cut grass and other delicate vegetation more safely and with a greater degree of flexibility than devices using rotating rigid blades.

The head assembly in some known systems includes means for protecting the operator of the filament-type trimmer. For example, in U.S. Pat. No. 4,161,820, the housing includes a rearwardly-extending tail part which serves as a protection to the user to prevent inadvertent contact with the rotating cutting line. Another example is U.S. Pat. No. 5,644,844, in which a semi-circular shield is carried on the rear half of lower flange to protect the operator from flying debris. The disclosures of these references are incorporated by reference herein.

U.S. Pat. No. 5,010,720 discloses a semi-circle guard of tempered aluminum rod stock that is positioned to have a forwardmost arcuate portion in relation to a trimmer. The guard works in combination with a shield (that is part of the original trimmer). The guard and guide assembly can be used while trimming around stationary structures such as walls, large rocks, grave markers and the like to preclude contact of the stationary structure by the filament segment, thus preventing marring of the structure and wear of the filament segment. There are several problems with the guard of the device disclosed in this reference. First, even in the shown embodiment, there is a gap on both sides of the trimmer where the guard meets the shield. Gaps in the sides are particularly troublesome because the standard operation of a trimmer is a side-to-side motion. Second, some trimmers have smaller shields and/or no shields. The disclosure of this reference is incorporated by reference herein.

U.S. Pat. No. 4,501,332 is directed to a hand carried portable weeder convertible to a cultivator apparatus. In one embodiment, the standard guard is removed and replaced with a weeder/cultivator element for the string head of the apparatus. The weeder/cultivator element includes an inverted dish-shaped element. There are several problems with the guard of the device disclosed in this reference. For example, because the dish-shaped element is solid, it would limit how low the non-rigid filament(s) could cut. Further, because the dish-shaped element is solid, it would block visibility thereunder, despite the statements set forth in the reference. Still further, the peripheral edge of the dish-shaped element appears to be below the level of the non-rigid filament(s) such that the peripheral edge would push the vegetation down and make it impossible to get a good cut. The disclosure of this reference is incorporated by reference herein.

U.S. Pat. No. 4,890,389 is directed to a guard for a power trimming device. The guard partially encloses the rotating cutting element as a housing is formed from a rigid bar having a generally circular configuration with an open front portion formed by outwardly flared ends. This reference discloses that the guard can be secured to the conventionally existing cutter housing of a trimming device using (in one embodiment) a compound adjustable bracket. There are several problems with the guard of the device disclosed in this reference. For example, there is no forward protection as the front portion is open. Another example is that the guard appears to be below the level of the non-rigid filament(s) so that the guard would push the vegetation down and make it impossible to get a good cut. The disclosure of this reference is incorporated by reference herein.

U.S. Pat. No. 4,118,865 is directed to a grass trimmer that includes a shroud 30 integrally formed with the housing of the grass trimmer. The shroud partially surrounds the hub member and cutting line to control the direction in which grass clippings or other objects engaged by the spinning line are projected. To emphasize, the shroud must be partial or it would not direct the grass clippings. The disclosure of this reference is incorporated by reference herein.

U.S. Pat. No. 3,831,278 is directed to a grass trimmer that includes a solid disc shield. In one embodiment the disc shield is provided with a peripheral flange or leg of limited height and size as a guide for edging close to fixed objects and as a spacer for the slicing elements above the ground. The reference specifies, however, that the apparatus may safely be used without a disc shield if desired. There are several problems with the guard of the device disclosed in this reference. For example, because the disc shield is solid, it would limit how low the non-rigid filament(s) could cut. Further, because the disc shield is solid, it would block visibility thereunder. Still further, because the disc shield is solid, there is a problem with debris collecting under the solid disc shield and interfering with the non-rigid filament(s). The disclosure of this reference is incorporated by reference herein.

U.S. Pat. No. 4,189,901 is directed to a flail shredder that has an assembly that can be adjustably moved between positions in relation to the ground. The flail shredder includes a circular guide wheel indicated that is concentrically mounted on the flange of a second bearing assembly (which is coaxially mounted on the drive shaft). The circular guide wheel includes an imperforate circular shield and a resilient tubular rim. There are several problems with the guard of the device disclosed in this reference. For example, because the circular shield is imperforate, it would limit how low the non-rigid filament(s) could cut. Further, because the circular shield is imperforate, it would block visibility thereunder. The disclosure of this reference is incorporated by reference herein.

U.S. Pat. No. 5,115,870 is directed to a flexible flail trimmer for conventional trimming of grass, weeds, and the like, and for edging of sidewalks has a combined guide and guard rotatably mounted inboard of the trimmer cutting head. There are several problems with the guard of the device disclosed in this reference. For example, because the combined guide and guard is solid, it would limit how low the non-rigid filament (s) could cut. Further, because the combined guide and guard is solid, it would block visibility thereunder, despite the statements set forth in the reference. U.S. Pat. No. 5,023,998 discloses a housing or deck, which despite the small vents therethrough, would have similar problems as well as other problems. The disclosure of this reference is incorporated by reference herein.

BRIEF SUMMARY OF THE INVENTION

The present invention is directed to a guard for a filament-type trimmer. The purpose of the guard is to protect saplings (and other structures that are not to be trimmed) while trimming vegetation that is to be at least partially trimmed.

The filament-type trimmer has a head assembly substantially at a first end of an extension member and a handle assembly substantially at a second end of the extension member. The head assembly includes at least one rotatable non-rigid filament.

Preferred embodiments of the guard include three subsystems: a main guard body, a solid shield, and an attachment mechanism. The main guard body includes a base, a peripheral exterior ring, and a plurality of supports for holding the peripheral exterior ring in spaced relationship with the base. Together, the base, the peripheral exterior ring, and the plurality of supports define at least one aperture. The solid shield is attachable to the main guard body. The attachment mechanism is used to attach the main guard body to the filament-type trimmer extension member. When positioned, the rotatable non-rigid filament is peripherally surrounded by the main guard body when the rotatable non-rigid filament is rotating.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is an exploded top plan view of the first embodiment of the guard of the present invention including a main guard body, a solid shield, and an attachment mechanism.

FIG. 4 is a back view of the first embodiment of the main guard body.

FIG. 5 is a perspective view of the first embodiment of the main guard body.

FIG. 6 is an exploded perspective view of a second preferred embodiment of the guard of the present invention for use with a bent extension member of a filament-type trimmer.

DETAILED DESCRIPTION OF THE INVENTION

Figure 1A:
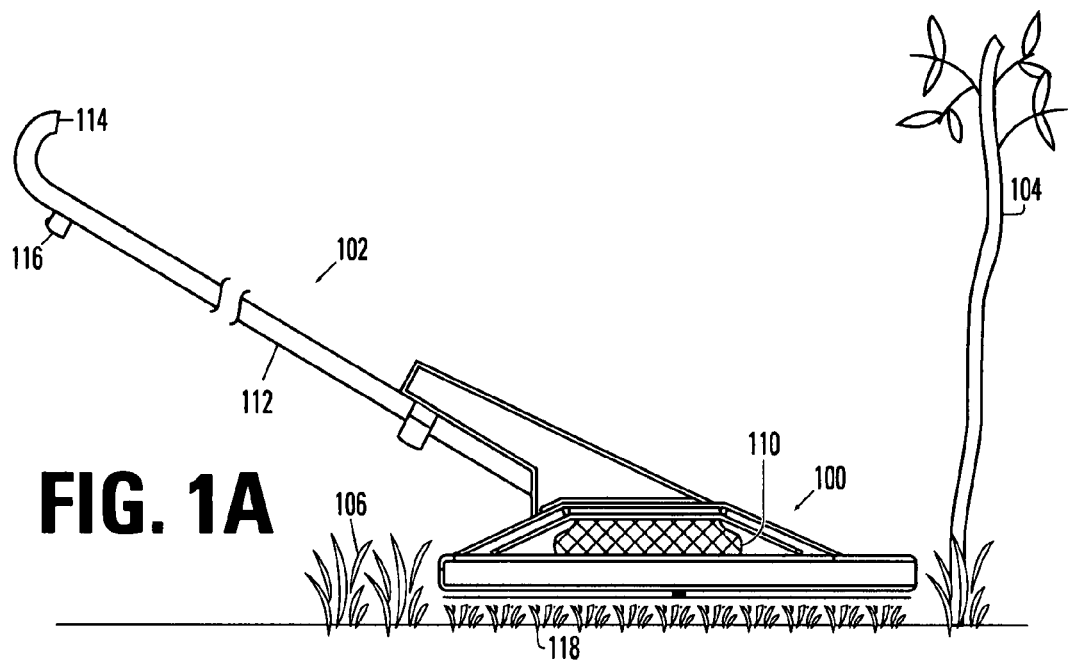
FIG. 1A is a side view of a first scene in which a filament-type trimmer having a first preferred embodiment of a guard of the present invention is approaching a structure not to be trimmed as it trims vegetation, the rotatable non-rigid filament positioned below the main guard body.
Figure 1B:
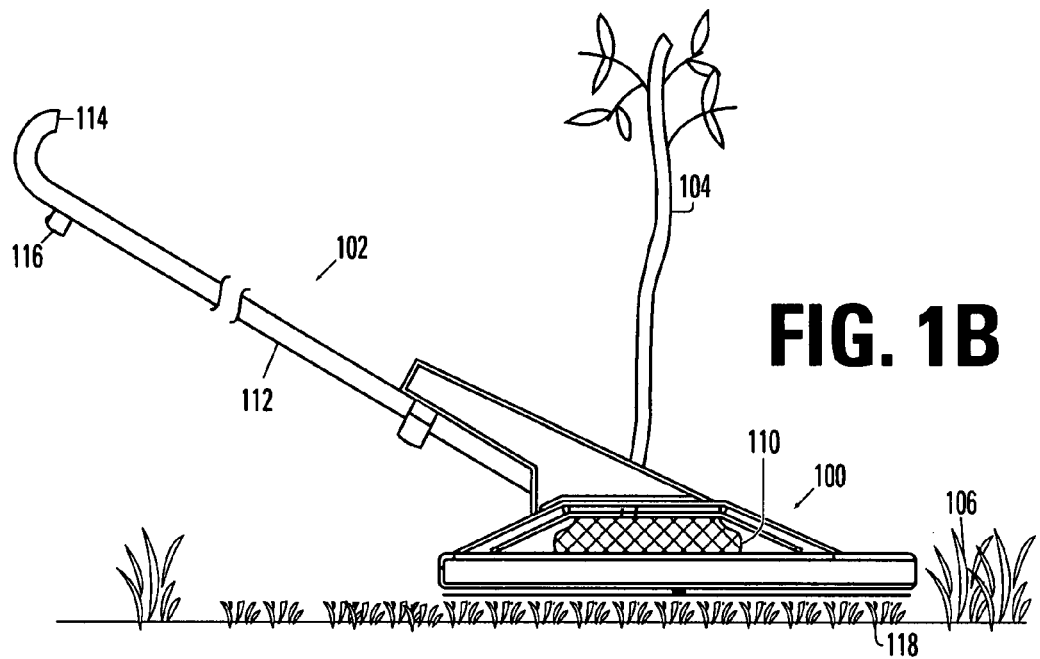
FIG. 1B is a side view of a second scene in which a filament-type trimmer having a guard of the present invention has trimmed vegetation as it approached the structure and is now trimming vegetation on the side of the structure toward the viewer.
Figure 1C:
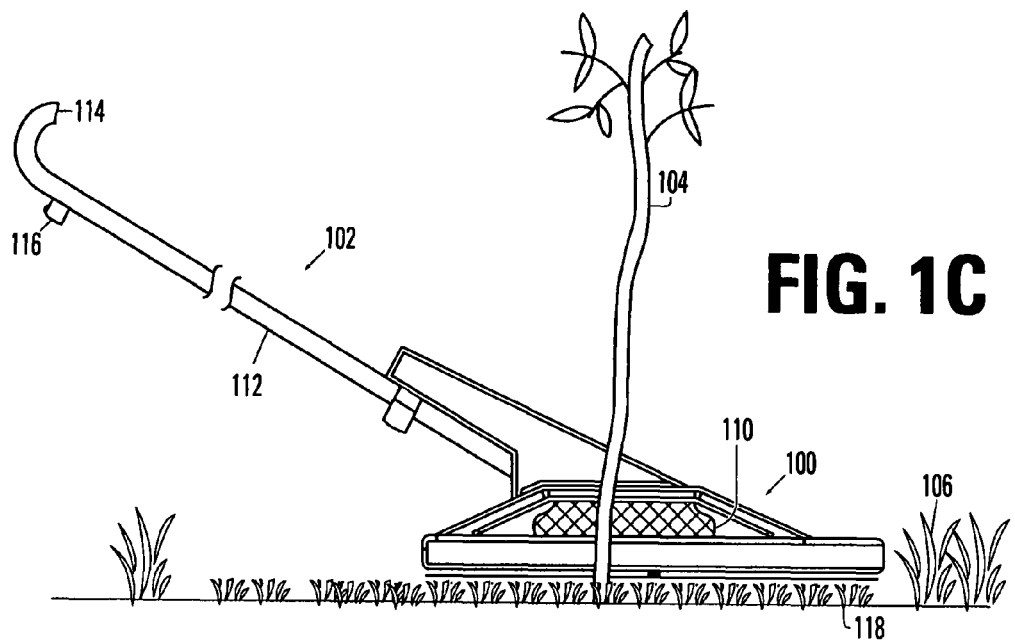
FIG. 1C is a side view of a third scene in which a filament-type trimmer having a guard of the present invention has trimmed vegetation on the side of the structure towards the viewer and is now trimming vegetation on the side of the structure away from the viewer.
Figure 1D:
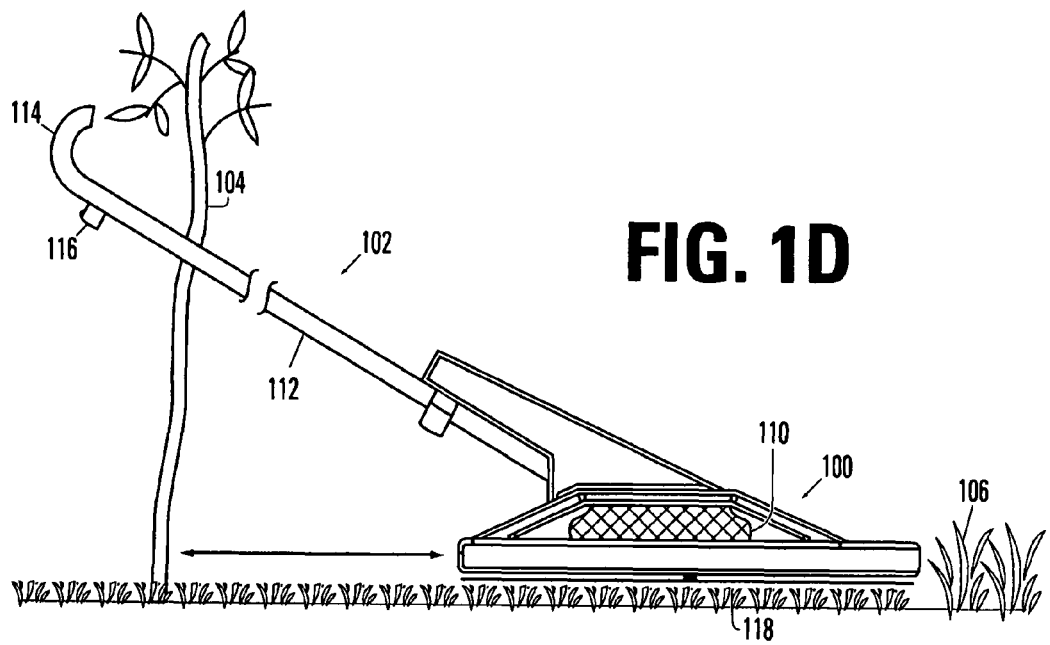
FIG. 1D is a side view of a fourth scene in which a filament-type trimmer having a guard of the present invention has trimmed vegetation on both sides of the structure and is now trimming vegetation beyond the structure.

As shown in FIGS. 1A-1D, the present invention is directed to guard 100 for a filament-type trimmer 102 for protecting saplings 104 and other structures not to be trimmed while trimming vegetation 106 that is to be at least partially trimmed. More specifically, FIG. 1A shows a first scene in which a filament-type trimmer 102 having a guard 100 of the present invention approaches a structure 104 not to be trimmed as the filament-type trimmer 102 trims vegetation 106. FIG. 1B shows a second scene in which the filament-type trimmer 102 having the guard 100 has trimmed vegetation 106 as it approached the structure 104 and is now trimming vegetation 106 on the side of the structure 104 toward the viewer. FIG. 1C shows a third scene in which the filament-type trimmer 102 having the guard 100 has trimmed vegetation 106 on the side of the structure 104 toward the viewer and is now trimming vegetation 106 on the side of the structure away from the viewer. FIG. 1D shows a fourth scene in which the filament-type trimmer 102 having the guard 100 has trimmed vegetation 106 on both sides of the structure 104 and is now trimming vegetation 106 beyond the structure 104. It should be noted that the filament-type trimmer 102 having the guard 100 may be brought into contact with the structure 104 from any side or at any angle (including from behind) without risking damage to the structure 104.

As set forth above, filament-type trimmers 102 (shown generally in FIGS. 1A-1D) generally include a head assembly 110 substantially at a first end of an extension member 112 and a handle assembly 114 substantially at a second end of the extension member 112. An activator 116 for selectively applying power to the filament-type trimmer 102 may be positioned, for example, on the handle assembly 114 or the extension member 112. The head assembly 110 includes a rotatable head rotated by a motor, the rotatable head having at least one non-rigid filament 118 that extends generally radially outwardly. Exemplary head assemblies, extension members, handle assemblies, activators, rotatable heads, motors, non-rigid filament(s) 118, and other components of filament-type trimmers are described in detail in the references incorporated by reference. Further, components of filament-type trimmers that are known in the art or yet to be discovered are incorporated herein by reference.

Figure 2:
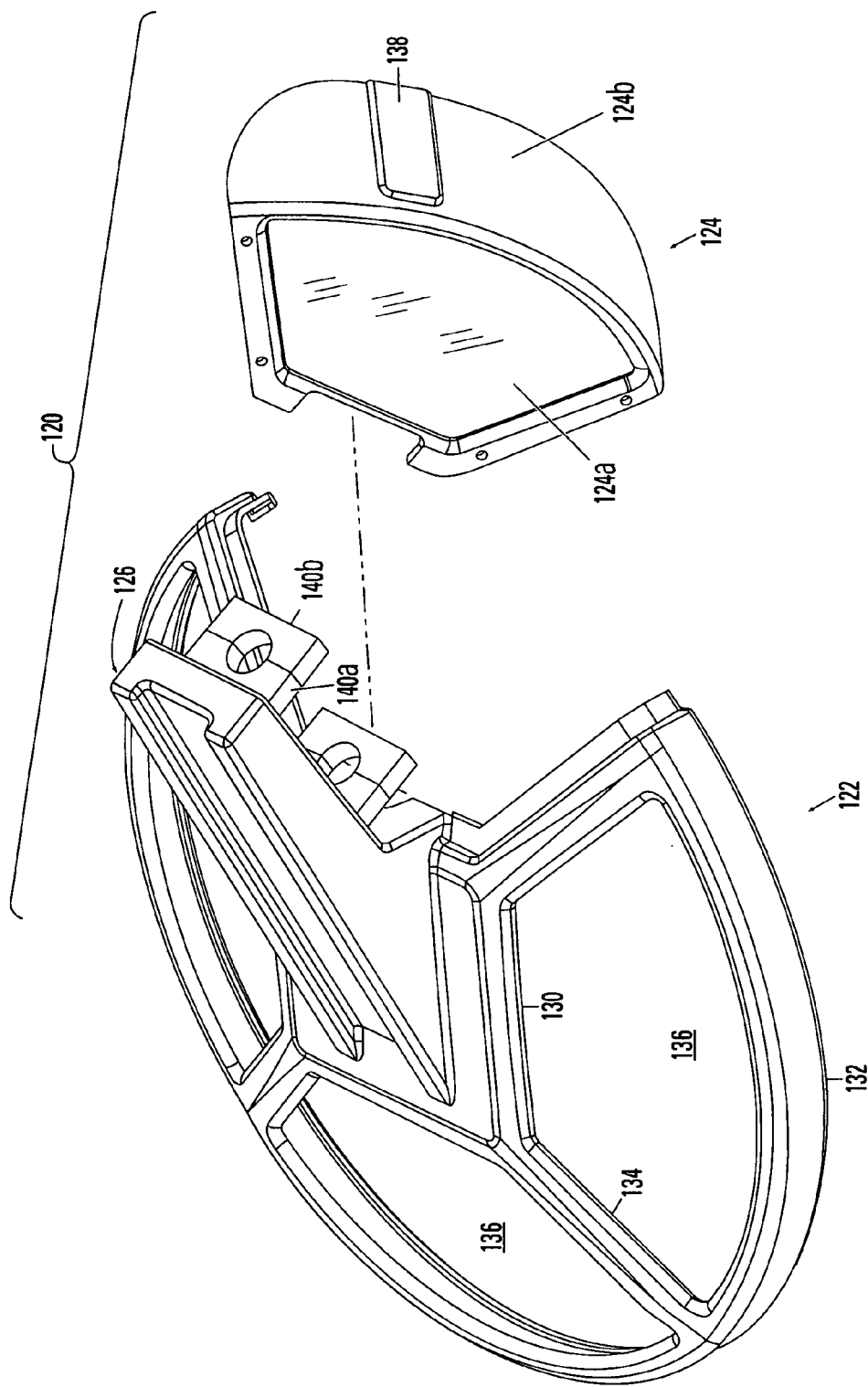
FIG. 2 is an exploded perspective view of a first embodiment of the guard of the present invention including a main guard body, a solid shield, and an attachment mechanism.

FIGS. 2 and 3 show a first embodiment of the guard 120 of the present invention which will be discussed generally as including three sub-systems: a main guard body 122, a solid shield 124, and an attachment mechanism 126. For purposes of providing an enabling example (but not to limit the scope of the invention), it should be noted that the main guard body 122, the solid shield 124, and the attachment mechanism 126 may be made of any durable and substantially rigid material (e.g. metal, plastics) by methods known or yet to be discovered.

In the first embodiment, the main guard body 122 (shown in FIG. 4 from the back and in FIG. 5 in perspective with part of the attachment mechanism omitted to provide a better view) includes a base 130, a peripheral exterior ring 132, and at least one of support 134. The peripheral exterior ring 132 of the main guard body 122 is actually a partial "ring." The peripheral exterior ring 132 works with part of the solid shield 124 to complete the ring around the peripheral exterior. Although shown as a separate (distinct) component, it should also be noted that the base 130 may be the intersection of a plurality of supports 134 rather than a separate component. The support(s) 134 hold the peripheral exterior ring 132 in spaced relationship with the base 130. The plurality of supports 134 are shown as extending radially from the base 130. Another way to describe this is that the at least one support 134 has an inner support end that is attached to the base 130 and an outer support end that is attached to the peripheral exterior ring 132 so that the at least one support 134 holds the peripheral exterior ring 132 in spaced relationship with the base 130. It should be noted that although four supports are shown, more or less supports could be used. The base 130, the peripheral exterior ring 132, and the plurality of supports 134 define apertures 136. In the shown embodiment, there are three large apertures 136 defined.

The solid shield 124 is attachable to the main guard body 122 (e.g. the base 130, the peripheral exterior ring 132, and/or the plurality of supports 134) using connectors including, but not limited to nuts and bolts, clamps, rivets, welding, or any connecting means known or yet to be discovered. The solid shield 124 helps to protect the use from flying debris. Because of its relatively small size, however, the solid shield 124 does not interfere with the operations of the non-rigid filament(s) 118. The shown size of the solid shield 124 is meant to be exemplary and is not meant to limit the scope of the invention. In the shown embodiment, the solid shield 124 covers about 20% of the top surface of the main guard body 122. Alternative embodiments could include a solid shield 124 covering between 15% and 50% of the top surface of the main guard body 122. In one preferred embodiment of the solid shield 124, the solid shield 124 includes a solid top portion 124a and a solid annular side portion 124b. The solid annular side portion 124b completes the peripheral exterior ring 132 so that the rotatable non-rigid filament(s) 118 is peripherally surrounded by (the non-rigid filament(s) 118 do not extend beyond) and below (in one preferred embodiments approximately 0.5"-3" below) the main guard body 122 when the non-rigid filament(s) 118 rotate. In the shown embodiment of the solid shield 124, a line cutter 138 is included to cut the non-rigid filament(s) 118 as they are extended.

The attachment mechanism 126 is used for attaching the base 130 to the filament-type trimmer 102 extension member 112 that is substantially straight. One of the advantages of preferred embodiments of the present invention is that the attachment mechanism 126 attaches to the extension member 112, and not to more fragile components of the filament-type trimmers 102 (e.g. the motor or a shaft through the motor). The shown attachment mechanism 126 is attached to the main guard body 122. Specifically, the attachment mechanism 126 is shown as being attached to the base 130, although alternative embodiments could attach the attachment mechanism 126 to alternative components. It should also be noted that the base 130 may be the intersection of a plurality of supports 134 rather than a separate component. The shown attachment mechanism 126 includes at least one two-part clamping mechanism 140a, 140b that attaches to the extension member 112 using connectors (including, but not limited to nuts and bolts, clamps, rivets, welding, or any connecting means known or yet to be discovered). In alternative preferred embodiments, the two-part clamping mechanism 140a, 140b and connectors can be replaced by at least one releasable clamp (e.g. the type used for bike seats) that has all the components fastened together (to avoid loss of components such as connectors) and allows for one handed operation. In still other alternative preferred embodiments, the two-part clamping mechanism 140a, 140b can be replaced with mechanisms discussed in connection with other embodiments of the present invention.

FIG. 6 shows a second embodiment of the guard 150 of the present invention for use with a filament-type trimmer having a bent extension member (not shown). The most significant difference between this second embodiment and the first embodiment is the angle of the attachment mechanism 152 as compared to the attachment mechanism 126 in the first embodiment. To avoid repetition, components that have the same function in both embodiments are not labeled or discussed. The angle, shown as 90°, is suitable for this embodiment because the extension member is bent. It should be noted that alternative preferred embodiments could have an attachment mechanism that can be adjusted in relation to the rest of the main guard body 122 to the angle appropriate to the extension member. It should be noted that alternative preferred embodiments could have replaceable attachment mechanisms that can be removed and replaced with other attachment mechanisms having the angle appropriate to the extension member. The shown attachment mechanism 152 is also different in that one part of the two-part clamping mechanism 154a, 154b is the body of the attachment mechanism 152. As shown, the body of the attachment mechanism 152 (the first part 154a of the two-part clamping mechanism 154a, 154b) has a notch (shown as semi-circular) defined therein and at least one holding block (the second part 154b of the two-part clamping mechanism 154a, 154b) has a similar notched defined therein. The two parts 154a, 154b are positioned as shown and fastened together using connectors (including, but not limited to nuts and bolts, clamps, rivets, welding, or any connecting means known or yet to be discovered) to secure the extension member 112 therebetween. In other alternative preferred embodiments, the two-part clamping mechanism 154a, 154b can be replaced with mechanisms discussed in connection with other embodiments of the present invention.

Figure 7:
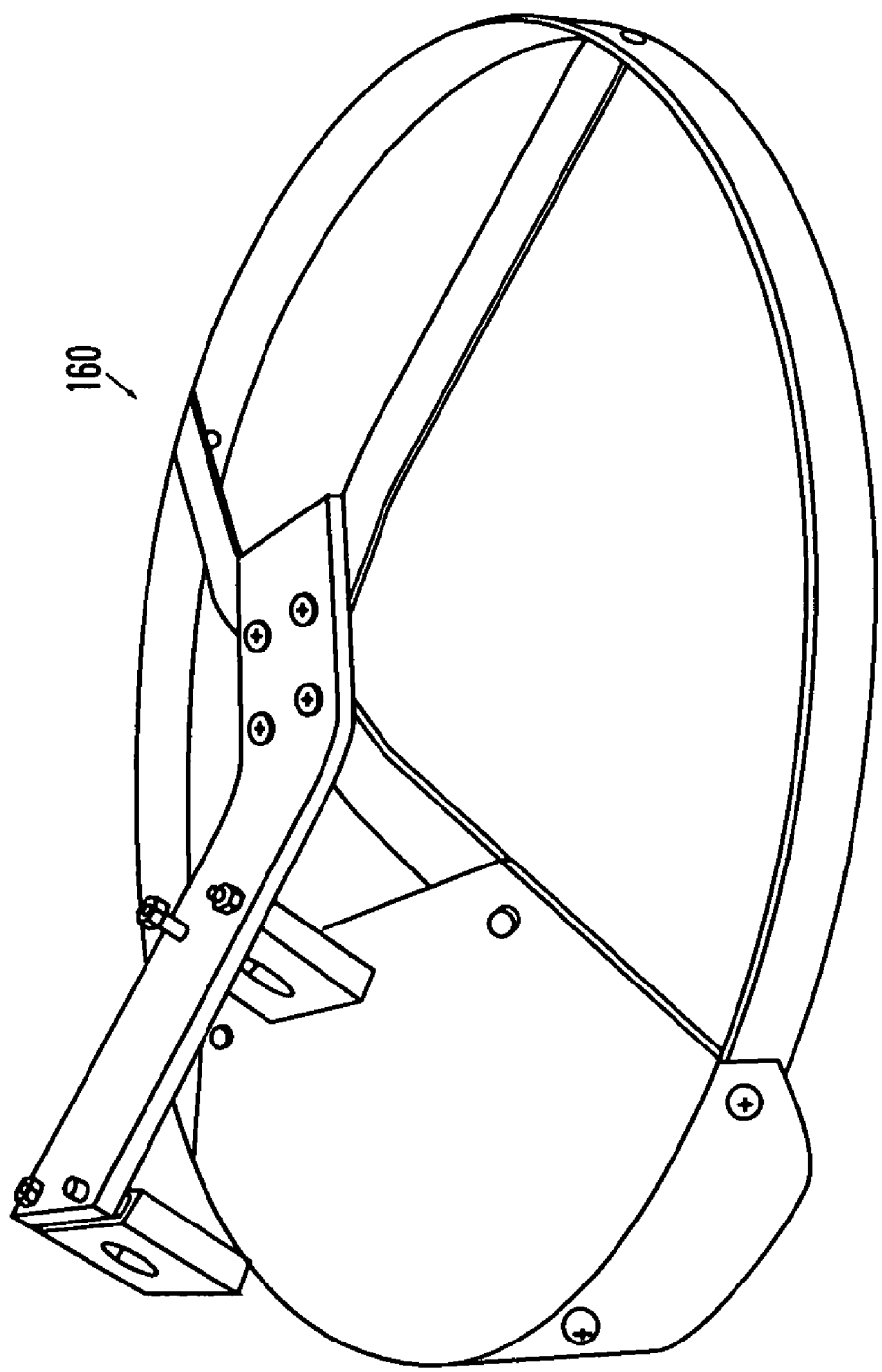
FIG. 7 is a perspective view of a third preferred embodiment of the guard of the present invention. This embodiment was one of the early embodiments of the present invention.

FIG. 7 shows a third preferred embodiment of the guard 160 of the present invention. This embodiment was one of the early embodiments of the present invention.

Figure 8:
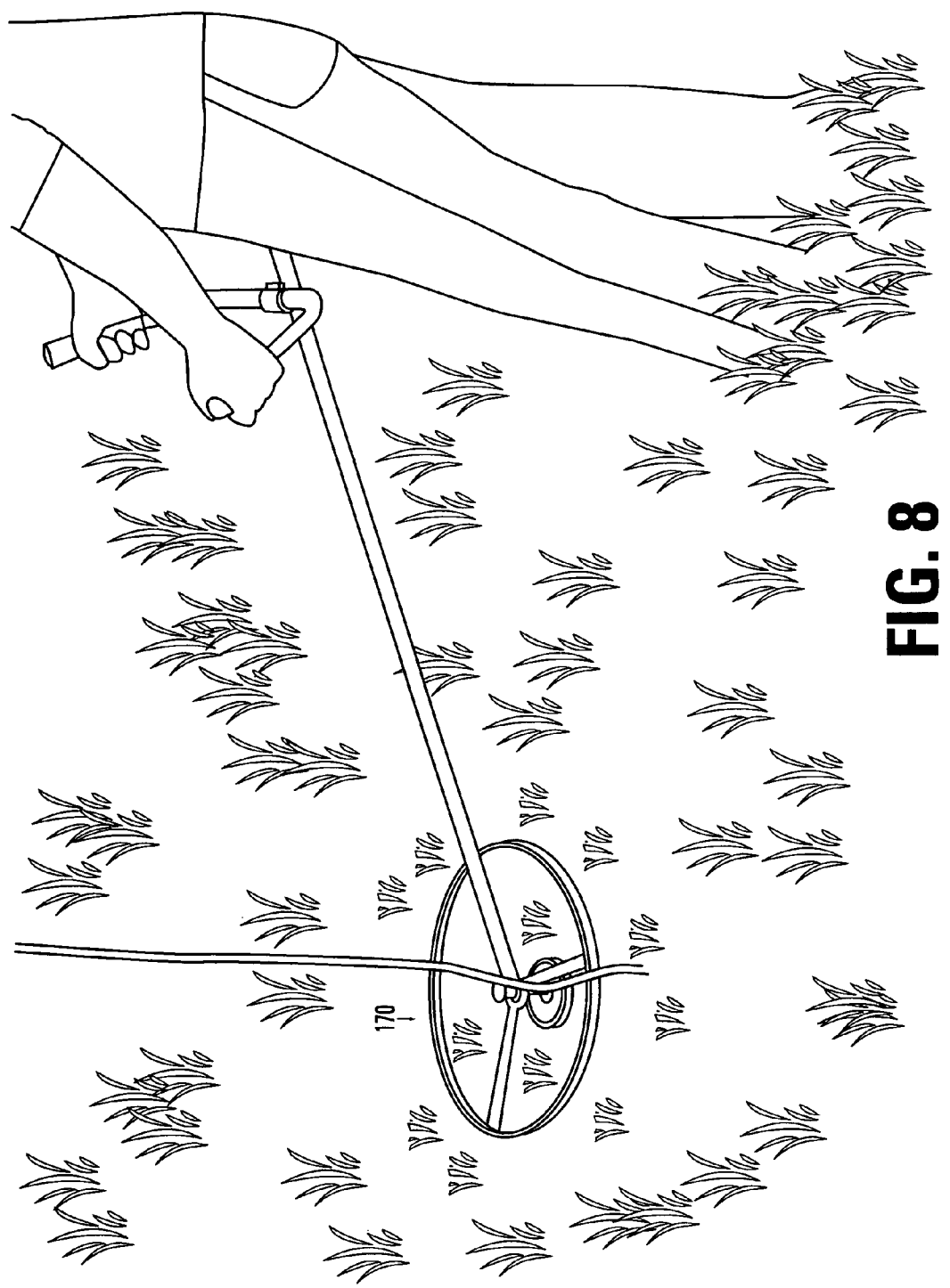
FIG. 8 shows a scene in which a fourth preferred embodiment of the guard of the present invention is being used such that a sapling is being protected from the non-rigid filament (s) by the exterior surface of the peripheral exterior ring.

FIG. 8 shows a fourth preferred embodiment of the guard 170 of the present invention. This embodiment was another of the early embodiments of the present invention.

The following advantages of the present invention are meant to be exemplary and are not meant to limit the scope of the invention. One advantage of the preferred embodiments of the present invention is that a filament-type trimmer 102 having a guard of the present invention may be brought into contact with structure 104 (e.g. saplings) from any side or at any angle (including from behind) without risking damage to the structure 104. Another exemplary advantage is that, because of the apertures 136, there is no limit as to how low the non-rigid filament(s) 118 could cut. For example, if the grass was ten inches long, the preferred embodiments of the present invention could be positioned over the top of the grass and slid almost to the bottom of the grass and, by moving the filament-type trimmer 102, the grass would be cut to the level of the non-rigid filament(s) 118. The apertures 136 also provide better visibility. For example, a user has better visibility in that he is able to view the vegetation 106 to be sure it is being trimmed properly. Another example is that a user has better visibility in that he is able to view the non-rigid filament(s) 118 to be sure it is not damaged or otherwise in need of repair, something that must be done almost hourly. Because the non-rigid filament(s) 118 is below the peripheral exterior ring 132, the vegetation is not pushed down by the peripheral exterior ring 132 and the non-rigid filament(s) 118 is able to get a good cut.

The guard 100 of the present invention may be sold as a unit with a filament-type trimmer 102 or it may be sold separately. If the guard 100 is sold separately, a user would have to install the guard 100 onto a filament-type trimmer 102. To install the guard 100 onto a filament-type trimmer 102, in most situations a user would first remove any guard, shield, or housing that the filament-type trimmer 102 has on it. The user would separate the solid shield 124 from the main guard body 122. If a two-part clamping mechanism is used, the user would remove one part of the two-part clamping mechanism 140b, 154b. The user would then position the main guard body 122 in relation to the filament-type trimmer 102 so that the head assembly 110 is substantially below the base 130 and the extension member 112 rests on or within one part of the two-part clamping mechanism 140a,154a. It should be noted that, in preferred embodiments, appropriate notches, catches, guides, and other positioning mechanisms would be provided to help the user with appropriate positioning of the filament-type trimmer 102. The user then secures the guard 100 to the filament-type trimmer 102. This can be done, for example, by attaching the solid shield 124 to the main guard body 122 and by clamping the of the two-part clamping mechanism 140a, 140b, 154a, 154b. The order in which the guard 100 is secured to the filament-type trimmer 102 can be varied without changing the scope of the invention.

It should be noted that relative terms used herein are meant to be relative and are not meant to be limiting. For example, the term "front" is meant to be relative to the term "back." Similarly, the term "top" is meant to be relative to the term "bottom."

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A guard for a filament-type trimmer for protecting structures not to be trimmed while trimming vegetation that is to be at least partially trimmed, said filament-type trimmer having a head assembly substantially at a first end of an extension member and a handle assembly substantially at a second end of said extension member, said head assembly including at least one rotatable non-rigid filament that rotates in a plane, said guard comprising:
    (a) a main guard body comprising:
        (i) a substantially planar base that is substantially parallel to the plane in which the at least one rotatable non-rigid filament rotates, said base being in a spaced relationship with said filament;
        (ii) a peripheral exterior ring;
        (iii) a plurality of supports for holding said peripheral exterior ring in spaced relationship with said base; and
        (iv) said base, said peripheral exterior ring, and said plurality of supports defining at least one aperture, said at least one aperture bounded by two adjacent supports, a portion of said peripheral exterior ring, and a portion of said base;
    (b) a continuous and un-apertured shield, said shield comprising a continuous and un-apertured shield top portion and a continuous and un-broken shield annular side portion, said shield attachable to said main guard body so that said shield top portion spans the space between two adjacent supports and a portion of said base;
    (c) an attachment mechanism directly attached to said base, said attachment mechanism for attaching said main guard body to the filament-type trimmer extension member; and
    (d) said shield annular side portion and said peripheral exterior ring of said main guard body peripherally surrounding the at least one rotatable non-rigid filament when the at least one rotatable non-rigid filament is rotating.

2. The guard of claim 1, wherein said shield is attachable to a component of said main guard body selected from the group consisting of:
    (a) said base;
    (b) said peripheral exterior ring; and
    (c) at least one of said plurality of supports.

3. The guard of claim 1, wherein said attachment mechanism is a two-part clamping mechanism.

4. The guard of claim 1, wherein the at least one rotatable non-rigid filament is below said main guard body when rotating.

5. The guard of claim 1, wherein said plurality of supports is at least three supports.

6. The guard of claim 1, wherein said peripheral exterior ring is a partial ring and at least part of said shield completes the ring of said peripheral exterior ring.

7. The guard of claim 1, wherein said peripheral exterior ring has a cross-section having a height and a width, said height being perpendicular to the plane in which the at least one rotatable non-rigid filament rotates and said width being parallel to the plane in which the at least one rotatable non-rigid filament rotates, said height being larger than said width.

8. A guard for a filament-type trimmer for protecting structures not to be trimmed while trimming vegetation that is to be at least partially trimmed, said filament-type trimmer having a head assembly substantially at a first end of an extension member and a handle assembly substantially at a second end of said extension member, said head assembly including at least one rotatable non-rigid filament that rotates in a plane, said guard comprising:
- (a) a main guard body comprising:
  - (i) a substantially planar base that is substantially parallel to the plane in which the at least one rotatable non-rigid filament rotates, said base being in a spaced relationship with said filament;
  - (ii) a plurality or supports, each said at least one support having an inner support end and an outer support end, said inner support end directly attached to said base;
  - (iii) a peripheral exterior ring, said outer support ends directly attached to said peripheral exterior ring;
  - (iv) said peripheral exterior ring in spaced relationship with said base; and
  - (v) said base, said peripheral exterior ring, and plurality of supports defining at least one aperture, said at least one aperture bounded by two adjacent supports, a portion of said peripheral exterior ring, and a portion of said base;
- (b) a continuous and un-apertured shield, said shield comprising a continuous and un-apertured shield top portion and a continuous and un-broken shield annular side portion, said shield attachable to said main guard body so that said shield top portion spans the space between two adjacent supports and a portion of said base;
- (c) an attachment mechanism directly attached to said base, said attachment mechanism for attaching said main guard body to the filament-type trimmer extension member; and
- (d) said shield annular side portion and said peripheral exterior ring of said main guard body peripherally surrounding the at least one rotatable non-rigid filament when the at least one rotatable non-rigid filament is rotating.

9. The guard of claim 8, wherein said shield is attachable to a component of said main guard body selected from the group consisting of:
- (a) said base;
- (b) said peripheral exterior ring; and
- (c) at least one of said plurality of supports.

10. The guard of claim 8, wherein said attachment mechanism is a two-part clamping mechanism.

11. The guard of claim 8, wherein the at least one rotatable non-rigid filament is below said main guard body when rotating.

12. The guard of claim 8, wherein said plurality of supports is at least three supports.

13. The guard of claim 8, wherein said peripheral exterior ring is a partial ring and at least part of said shield completes the ring of said peripheral exterior ring.

14. The guard of claim 8, wherein said peripheral exterior ring has a cross-section having a height and a width, said height being perpendicular to the plane in which the at least one rotatable non-rigid filament rotates and said width being parallel to the plane in which the at least one rotatable non-rigid filament rotates, said height being larger than said width.

15. A guard for a filament-type trimmer for protecting structures not to be trimmed while trimming vegetation that is to be at least partially trimmed, said filament-type trimmer having a head assembly substantially at a first end of an extension member and a handle assembly substantially at a second end of said extension member, said head assembly including at least one rotatable non-rigid filament that rotates in a plane, said guard comprising:
- (a) a main guard body comprising:
  - (i) a substantially planar base that is substantially parallel to the plane in which the at least one rotatable non-rigid filament rotates, said base being in a spaced relationship with said filament;
  - (ii) a peripheral exterior ring which is a partial ring;
  - (iii) a plurality of supports, each said at least one support having an inner support end and an outer support end, said inner support end directly attached to said base and said outer support end directly attached to said peripheral exterior ring;
  - (iv) said peripheral exterior ring being held in a spaced relationship with said base by said plurality of supports; and
  - (v) said base, said peripheral exterior ring, and said at least one support defining at least one aperture, said plurality of supports aperture bounded by two adjacent supports, a portion of said peripheral exterior ring, and a portion of said base;
- (b) a continuous and un-apertured shield, said shield comprising a continuous and un-apertured shield top portion and a continuous and un-broken shield annular side portion, said shield attachable to said main guard body so that said shield top portion spans the space between two adjacent supports and a portion of said base, said shield annular side portion completes the ring of said peripheral exterior ring;
- (c) an attachment mechanism directly attached to said base, said attachment mechanism for attaching said main guard body to the filament-type trimmer extension member; and
- (d) said shield annular side portion and said peripheral exterior ring of said main guard body peripherally surrounding the at least one rotatable non-rigid filament when the at least one rotatable non-rigid filament is rotating.

16. The guard of claim 15, wherein said shield is attachable to a component of said main guard body selected from the group consisting of:
- (a) said base;
- (b) said peripheral exterior ring; and
- (c) at least one of said plurality of supports.

17. The guard of claim 15, wherein said attachment mechanism is a two-part clamping mechanism.

18. The guard of claim 15, wherein the at least one rotatable non-rigid filament is below said main guard body when rotating.

19. The guard of claim 15, wherein said plurality of supports is at least three supports.

20. The guard of claim 15, wherein said peripheral exterior ring has a cross-section having a height and a width, said height being perpendicular to the plane in which the at least one rotatable non-rigid filament rotates and said width being parallel to the plane in which the at least one rotatable non-rigid filament rotates, said height being larger than said width.

* * * * *